March 29, 1960

W. HAMILTON 2,930,548

AIRCRAFT STEERING MECHANISM

Filed March 21, 1956

INVENTOR.
WALLACE HAMILTON
BY
ATTORNEY

INVENTOR.
WALLACE HAMILTON
BY
ATTORNEY

March 29, 1960

W. HAMILTON 2,930,548

AIRCRAFT STEERING MECHANISM

Filed March 21, 1956

INVENTOR.
WALLACE HAMILTON
BY
ATTORNEY

United States Patent Office 2,930,548
Patented Mar. 29, 1960

2,930,548

AIRCRAFT STEERING MECHANISM

Wallace Hamilton, Bentleyville, Ohio, assignor to Cleveland Pneumatic Industries, Inc., Cleveland, Ohio, a corporation of Ohio Application March 21, 1956, Serial No. 572,884

9 Claims. (Cl. 244—50)

This invention relates generally to steering mechanisms and more particularly to a steering mechanism adapted for use in the ground steering of an aircraft.

It is an important object of this invention to provide an aircraft steering mechanism which has a high torque efficiency through large steering angles.

It is another important object of this invention to provide a steering mechanism which may be swiveled through a full 360° without disconnecting any of the elements so that the aircraft can be maneuvered in confined areas.

It is still another object of this invention to provide an aircraft landing gear incorporating a steering mechanism which is capable of full swiveling and which produces a high torque efficiency through wide steering angles.

Further objects and advantages will appear from the following descriptions and drawings, wherein.

In the modern aircraft, it is necessary to provide power steering to facilitate the ground handling of the aircraft wherein the steering mechanism provides sufficient torque to steer the wheels through the entire range of steering even when there is no forward motion. In most steering mechanisms, the torque efficiency drops off radically as the steering motor rotates to positions spaced from the neutral position, wherein the steerable wheels are aligned with the major axis of the aircraft. In a steering mechanism, according to this invention, the torque efficiency remains high through large angles of steering so that the overall torque output, and in turn the size of the steering motor, may be reduced while still providing sufficient torque to steer in the extreme positions. It is also necessary, particularly in shipboard naval aircraft, to provide full swivel of the nose wheel so that the aircraft can be maneuvered in confined places. In most prior art steering mechanisms, it has been necessary to provide a manual or automatic disconnect in order to swivel the wheel. However, in the instant steering mechanism, full swiveling may be accomplished without disconnecting any of the steering linkage.

Figure 1:
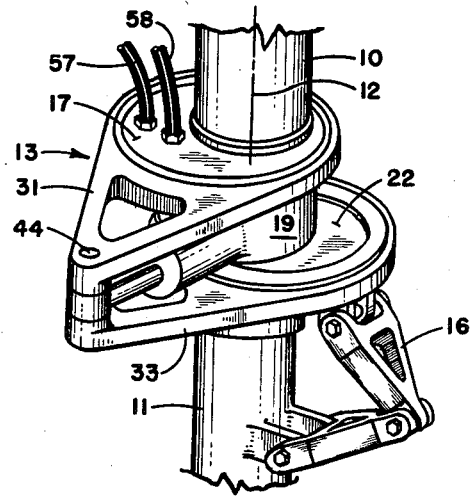
Figure 1 shows a preferred steering mechanism according to this invention as it would be mounted on a typical landing gear.
Figure 2:
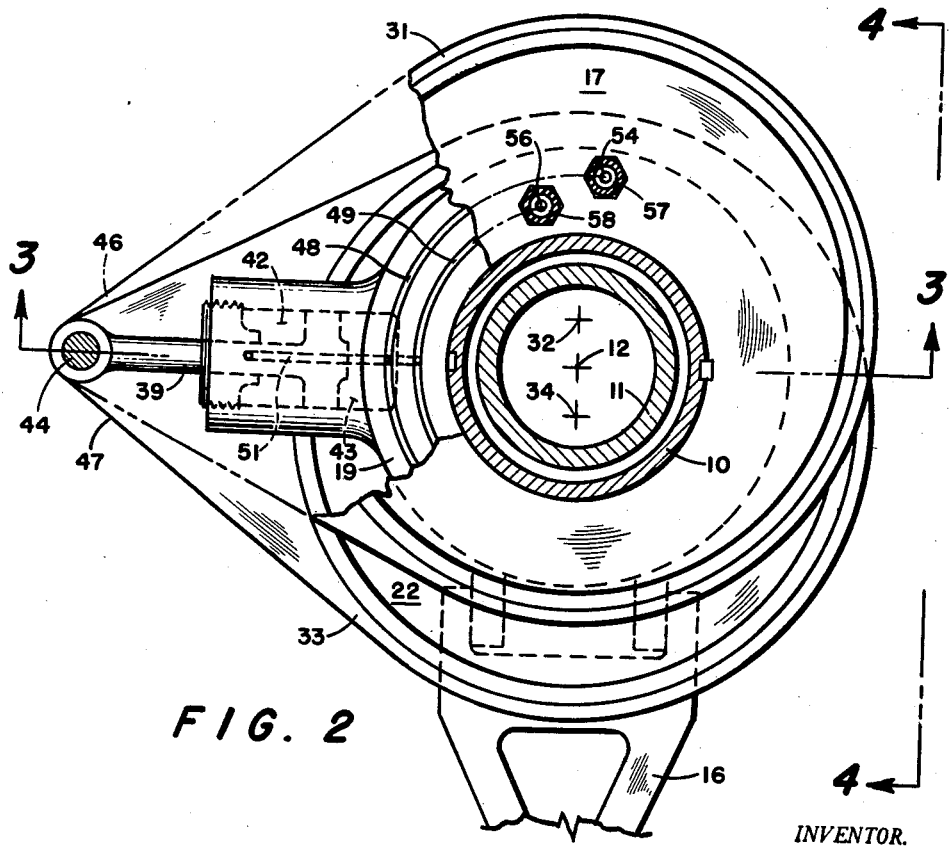
Figure 2 is a fragmentary plan view, partially in section, showing the structural details of the steering mechanism.

Referring to the drawings, Figure 2 discloses the preferred steering mechanism as it would be mounted on a conventional landing gear which includes an upper telescoping member 10 and a lower telescoping member 11. The upper telescoping member 10 is adapted to be mounted on the frame of the aircraft and the lower telescoping member 11 is adapted to be provided with ground engaging wheels. The two telescoping members 10 and 11 are capable of relative rotation around a central axis 12. A steering mechanism shown generally at 13 is mounted on the upper telescoping member 10 and conventional torque arms 16 are connected to the steering mechanism and the lower telescoping member 11 to transmit the steering torque therebetween.

Figure 3:
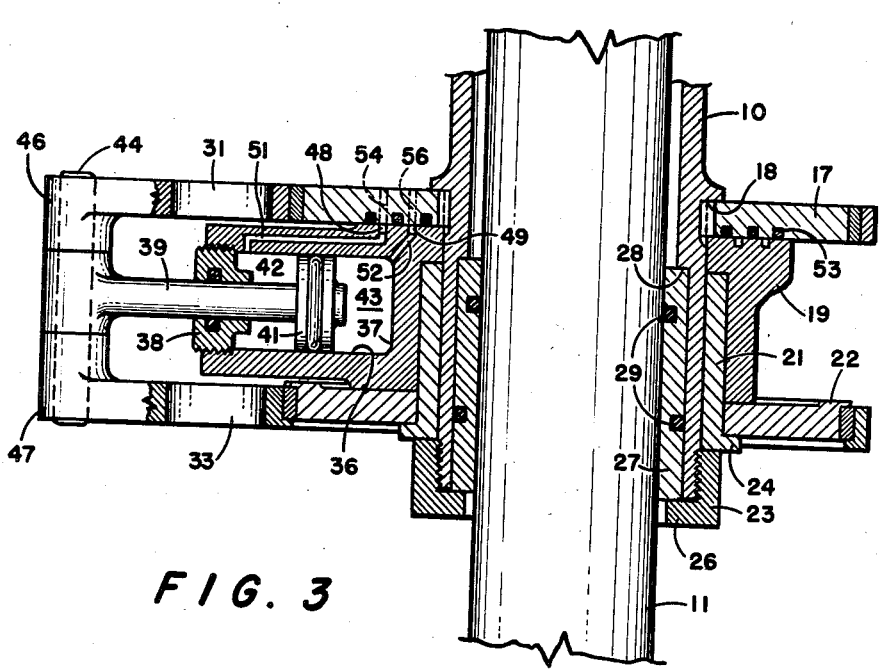
Figure 3 is a longitudinal section taken along 3—3 of Figure 2.
Figure 4:
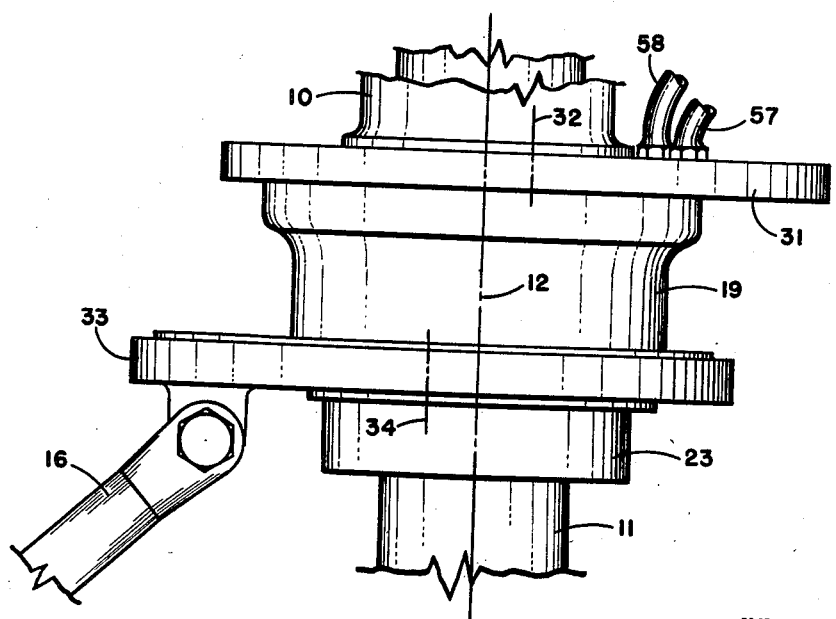
Figure 4 is a side elevation taken along 4—4 of Figure 2.

Reference should now be made to Figures 2 through 4 for a clear understanding of the structural details of the steering mechanism. A first eccentric 17 is keyed to the upper telescoping member 10 and axially positioned against a shoulder 18 by a cylinder member 19. The cylinder member 19 is journaled for rotation relative to the upper telescoping member 10 on a bearing 21 and is positioned between the first eccentric 17 and a second eccentric 22 which is also journaled on the bearing 21. A gland nut 23 threaded on to the lower end of the upper telescoping member 10 holds the bearing 21 in place and the bearing 21 is in turn formed with a radial flange 24 which engages the lower side of the second eccentric 22. The shoulder 18 and radial flange 24 therefore co-operate to secure various elements of the steering mechanism against axial motion relative to the upper telescoping member 10. The torque arms 16 are pivotally connected to the second eccentric 22 which is the output member of the steering mechanism. An inwardly extending flange 26 on the gland nut 23 engages and co-operates with a shoulder 28 on the upper telescoping member 10 to axially locate a gland member 27 which in turn provides the radial support to prevent lateral motion between the two telescoping members 10 and 11 while permitting relative axial motion therebetween. If a pneumatic spring is utilized to cushion the impact of landing, and resiliently support the weight of the aircraft when it is on the ground, the gland should be provided with fluid seals 29.

A first collar or link 31 is journaled on the first eccentric for rotation about a first eccentric axis 32 which is spaced from and parallel to the central axis 12. A second collar 33 is journaled for rotation relative to the second eccentric 22 about an axis 34 which is parallel to and spaced from the central axis 12, a distance equal to the spacing between the central axis 12 and the first eccentric axis 32. It should be understood that the second eccentric 22 is rotatable relative to the upper telescoping member 10 around the central axis 12 so the axis 34 rotates around the central axis 12 as the second eccentric 22 rotates.

The cylinder member 19 is formed with a radially extending cylinder bore 36 which is closed at its inner end by a radial wall 37 and at its outer end by a gland member 38. A piston rod 39 extends through the gland member 38 and is provided with a piston head 41 which divides the fluid cavity within the cylinder bore 36 into a first chamber 42 and a second chamber 43. Therefore, if fluid under pressure is supplied to the first chamber 42 when the second chamber 43 is connected to a reservoir return, an axial force is produced on the piston head 41 urging it longitudinally to the right as shown in Figures 2 and 3. This force is of course transmitted to the piston rod 39. Conversely if the second chamber 43 is supplied with fluid under pressure and the first chamber 42 is connected to the reservoir return, a force is produced in the piston rod 39, urging it to the left. The piston rod 39 is pivotally connected to both of the collars 31 and 33 by a pivot pin 44 which projects through extending portions 46 and 47 formed on the collars 31 and 33 respectively. First and second concentric annular grooves 48 and 49 which open to the lower face of the first eccentric 17 are formed in the cylinder member 19. The first annular groove 48 is connected to the first chamber 42 by fluid passageway 51 in the cylinder member 19 and the second annular groove 49 is connected to the second chamber 43 by a fluid passageway 52 in the cylinder member 19. The first eccentric 17 is provided with fluid seals 53 which engage the surface of the cylinder member 19 adjacent to the grooves 48 and 49 on either side and between the grooves to isolate the grooves from each other. The first eccentric 17 is formed with first and second bores 54 and 56 which connect with the first and second grooves 48 and 49 respectively and to pressure hoses 57 and 58 respectively. The bores 54 and 56 have been moved into the plane of the section in Figure 3 however, they will normally be located in the large portion of the first eccentric 17 as shown in Figure 2. Therefore, if fluid under pressure is applied to the pressure hose 57 the first chamber 42 is pressurized and if fluid under pressure is supplied to the pressure hose 58 the second chamber 43 is pressurized. The two pressure lines would be connected to a valve (not shown) which is in turn connected to a source of pressure fluid and a reservoir return. A suitable valve for this purpose is shown in the copending application of Walter H. Hogan, Serial No. 489,987, now U.S. Patent No. 2,892,450, filed February 23, 1955.

In operation, if the elements are in the position shown in Figure 2, and the first chamber 42 is supplied with fluid under pressure and the second chamber 43 is connected to the reservoir return, a force is developed in the piston rod 39 urging it to the right. This force pulls the pivot pin 44 in a direction towards the central axis 12 which, in turn produces a rotational torque on the collar 31 and cylinder member 19 which has a magnitude that is a function of the size of the force and the effective distance between the central axis 12 and the fixed eccentric axis 32. The torque rotates the collar and cylinder member in counterclockwise direction to a bottom dead center position wherein the pivot pin 44 is contained in a plane through both of the axes 12 and 32, with the pivot pin 44 closest to the central axis 12. Conversely, if the elements are in the position of Figure 2 and fluid under pressure is supplied to the second chamber 43 and the first chamber 42 is connected to the reservoir return, a force is developed urging the pivot pin 44 radially away from the central axis which produces a torque in the collar 31 and cylinder member 19 which produces a clockwise rotation until the pivot pin 44 is in a plane through both of the axes 12 and 32. However, at this time, the pivot pin 44 is closest to the first eccentric axis 32. Those skilled in the art will recognize that the collar 31 and cylinder member 19 will rotate in either direction from the position shown in Figure 2 through 90° with one full stroke of the piston head 41 between top and bottom dead center positions.

The relative movement between the second eccentric 22 and the cylinder member 19 should now be considered. If the elements are in the position shown in Figure 2, and the chamber 42 is supplied with pressure fluid, the pivot pin is urged to the right which in turn produces a force on the second eccentric 22 through the axis 34, urging it to the right. This produces rotational moments, which is a function of the magnitude of the force and the effective distance between the central axis 12 and the axis 34, which causes rotation of the second eccentric 22 relative to the cylinder member 19 in a counterclockwise direction. This rotation will continue until the pivot pin 44 is in a plane containing both of the axes 12 and 34 and the axis 34 is remote from the pivot pin 44. If the pressure fluid is supplied to the second chamber 43, rotation of the second eccentric 22, relative to the cylinder member 19 in a clockwise direction will be produced until the pivot pin 44 is contained in a plane through both of the axes 12 and 34 and the axis 34 is closest to the pivot pin 44. Therefore, one stroke of the piston 41 and piston rod 39 produces relative rotation between the second eccentric 22 and the cylinder member 19 through 180° in the same direction as the relative rotation between the cylinder member 19 and the first eccentric 17. Therefore, one full stroke of the piston head 41 and rod 39 will cause relative rotation of the second eccentric 22 relative to the first eccentric 17 through a full 360°.

The operation is illustrated in the schematic views of Figures 5a through 5d. Since the torque arms 16 are connected to the second eccentric 22, the resulting rotation can easily be seen. Assuming the elements are in the position shown in Figure 5a in which the piston head 41 is midway in its stroke within the cylinder bore 36 and the torque arms 16 are in the lower position, movement of the piston head 41 through a half stroke to the top dead center position shown in Figure 5b, causes rotation of the second eccentric 22 and the torque arms 16 through 180° in a counterclockwise direction to the position of Figure 5b. Conversely, movement of the piston head 41 to the bottom dead center position shown in Figure 5d causes the torque arms to rotate through 180° to the position of that figure. Therefore, one complete stroke of the piston head 41 will produce rotation of the torque arms through a full 360° during which time the cylinder member 19 rotates through 180°. The various elements can be arranged so that they assume either the position of Figure 5a or 5c when the wheels of the aircraft are in the neutral position, the choice being determined by the amount of clearance within the aircraft structure for the retraction landing gear. If most of the clearances are on the left side, the elements would be positioned in the position of Figure 5c and if most of the clearances were on the right side, the position of Figure 5a would be used. The eccentric axes 32 and 34 are both equally spaced from the central axis 12 so they are coaxial when the elements are in the position of Figure 5b and contained in a plane through the central axis and on opposite sides thereof when the elements are in the position of Figure 5d.

Because the steering motor is capable of producing a full 360° of rotation for a single stroke of the piston head 41, the torque efficiency for any given steering angle will be greater than that of the prior art structures since the torque efficiency of such mechanism drops to zero at the theoretical maximum steering angle. However, because the torque efficiency curve follows substantially a sine function, the longer the theoretical torque curve, the greater the efficiency will be for any given steering angle.

Figure 5A:
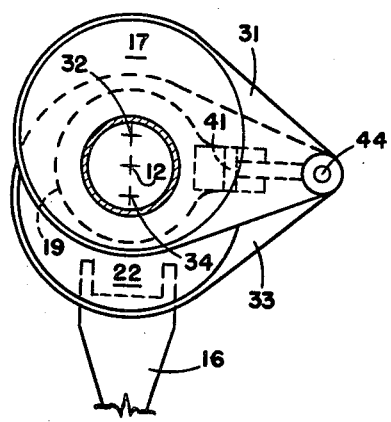
Figures 5a through 5d are schematic illustrations of the steering mechanism as it operates through one revolution.
Figure 5B:
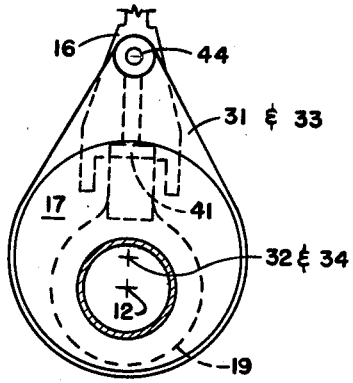
Figure 5C:
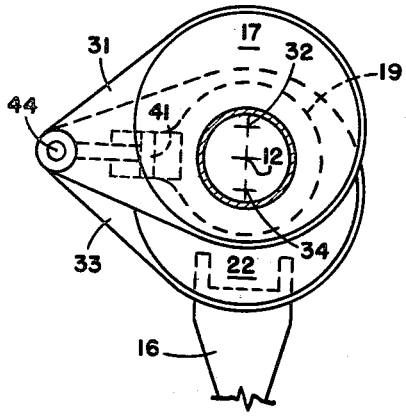
Figure 5D:
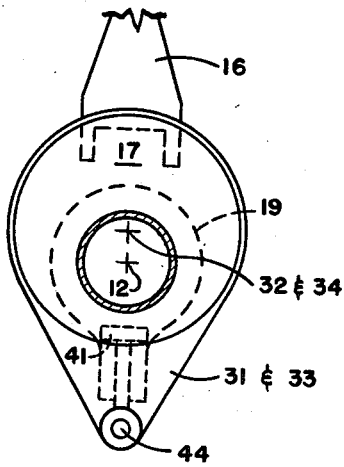

When full swiveling is desired, the landing wheel, and in turn the torque arms 16, can be rotated by an external source of power and the elements will progress from the position of Figure 5a to the position of Figure 5b when the landing wheel is rotated through 180°. Continued rotation to the position of Figure 5c is caused when the torque arm 16 is returned to its forward position by continued rotation in a counterclockwise position through 180° from the position of Figure 5b. If the torque arms are rotated in the same direction through an additional 180°, the elements assume the position of Figure 5d and still an additional 180° of torque arm rotation returns the elements to the position of Figure 5a. Therefore, a full cycle of the steering mechanism is produced when the second eccentric moves through 720°. A simple servomechanism should be used to sense whether the elements are in the neutral position of Figure 5a or 5c if this is critical in the particular landing gear installation.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A steering mechanism comprising a fixed element, an eccentric member journaled on said fixed element for rotation relative thereto about a central axis, a first collar journaled on said fixed element for rotation about a first eccentric axis spaced from and parallel to said central axis, a second collar journaled on said eccentric member for rotation relative thereto around a second eccentric axis parallel to and spaced from said central axis, and means governing the rotation of said eccentric member including a pair of members capable of relative longitudinal motion one of which is journaled on said fixed element for rotation about said central axis and the other of which is pivotally connected to both of said collars.

2. A steering mechanism comprising a fixed element, an eccentric member journaled on said fixed element for rotation relative thereto about a central axis, a first collar journaled on said fixed element for rotation about a first eccentric axis spaced from and parallel to said central axis, a second collar journaled on said eccentric member for rotation relative thereto around a second eccentric axis parallel to said central axis and spaced therefrom, and a fluid motor governing the rotation of said eccentric member including piston and cylinder members capable of relative axial motion one of which is journaled for rotation about said central axis and the other of which is pivotally connected to both of said collars.

3. A steering mechanism comprising a fixed element, an eccentric member journaled on said fixed element for rotation relative thereto about a central axis, a first collar journaled on said fixed element for rotation about a first eccentric axis spaced from and parallel to said central axis, a second collar journaled on said eccentric member for rotation relative thereto around a second eccentric axis parallel to said central axis and spaced therefrom a distance equal to the spacing between said first eccentric axis and said central axis, and a fluid motor governing the rotation of said eccentric member including piston and cylinder members capable of relative axial motion one of which is journaled on said fixed element for rotation about said central axis and the other of which is pivotally connected to both of said collars.

4. A steering mechanism comprising a fixed element, an eccentric member journaled on said fixed element for rotation relative thereto about a central axis, a first collar journaled on said fixed element for rotation about a first eccentric axis spaced from and paralleled to said central axis, a second collar journaled on said eccentric member for rotation relative thereto around a second eccentric axis parallel to said central axis and spaced therefrom a distance equal to the spacing between said first eccentric axis and said central axis, and a fluid cylinder journaled on said fixed member for rotation about said central axis, and a cooperating piston axially movable relative to said cylinder under the influence of pressure fluid pivotally connected to both of said collars.

5. A steering mechanism comprising a fixed element, an eccentric member journaled on said fixed element for rotation about a central axis, a first collar journaled on said fixed element for rotation about a first eccentric axis spaced from and paralleled to said central axis, a second collar journaled on said eccentric member for rotation relative thereto around a second eccentric axis spaced from and parallel to said central axis, a cylinder journaled on said fixed element between said collars for rotation about said central axis, and a piston axially movable relative to said cylinder between two extreme positions in response to pressure fluid, said piston being pivotally connected to both of said collars whereby said collars and cylinder move through one half a revolution when said piston moves between said extreme positions and said eccentric member simultaneously moves through one full revolution.

6. A steering mechanism comprising a fixed element, an eccentric member journaled on said fixed element for rotation about a central axis, a first collar journaled on said fixed element for rotation about a first eccentric axis spaced from and paralleled to said central axis, a second collar journaled on said eccentric member for rotation relative thereto around a second eccentric axis spaced from and parallel to said central axis, a cylinder journaled on said fixed element for rotation about said central axis with the axis of the cylinder intersecting said central axis, and a piston in said cylinder radially movable relative to said central axis between two extreme positions in response to pressure fluid, said piston being pivotally connected to both of said collars whereby said collars and cylinder move through one half a revolution when said piston moves between said extreme positions and said eccentric member simultaneously moves through one full revolution.

7. A steering mechanism comprising a fixed element, an eccentric member journaled on said fixed element for rotation about a central axis, a first collar journaled on said fixed element for rotation about a first eccentric axis spaced from and parallel to said central axis, a second collar journaled on said eccentric member for rotation relative thereto around a second eccentric axis parallel to said central axis and spaced therefrom a distance equal to the spacing between said first eccentric axis and said central axis, a first member journaled on said fixed element for rotation about said central axis, and a second member associated with said first member movable relative thereto pivotally connected to both of said collars and means associated with said first and second members adapted to produce said relative movement therebetween and thereby produce relative rotation between said eccentric and fixed element.

8. An aircraft landing gear comprising first and second telescoping members capable of relative rotation around a central axis, one of said members being adapted to be fixed to the frame of an aircraft and the other adapted to be provided with a ground engaging wheel, a first collar mounted on said first member for rotation relative thereto around a first eccentric axis spaced from said central axis, an eccentric member journaled for rotation around said central axis, a second collar journaled on said eccentric member for rotation relative thereto around a second eccentric axis spaced from said central axis, a fluid motor including piston and cylinder elements capable of relative axial motion in response to pressure fluid, one of said elements being journaled for rotation around said central axis and the other pivotally connected to said collars, and torque means connected between said second telescoping member and said eccentric member preventing relative rotation therebetween while permitting relative axial motion.

9. An aircraft landing gear comprising first and second telescoping members capable of relative rotation around a central axis, one of said members being adapted to be fixed to the frame of an aircraft and the other adapted to be provided with a ground engaging wheel, a first collar mounted on said first member for rotation relative thereto around a first eccentric axis spaced from and parallel to said central axis, an eccentric member journaled for rotation around said central axis, a second collar journaled on said eccentric member for rotation relative thereto around a second eccentric axis parallel to said central axis and spaced therefrom a distance equal to the spacing between said central axis and first eccentric axis, a fluid motor including piston and cylinder elements capable of relative axial motion in response to pressure fluid, one of said elements being journaled for rotation around said central axis and the other pivotally connected to said collars, and torque means connected between said second telescoping member and said eccentric member preventing relative rotation therebetween while permitting relative axial motion.

References Cited in the file of this patent
UNITED STATES PATENTS
2,759,687   Hogan ---------------- Aug. 21, 1956